Aug. 4, 1936.    J. C. CARLTON    2,049,891
SLIDE CLAMP
Filed Jan. 13, 1934
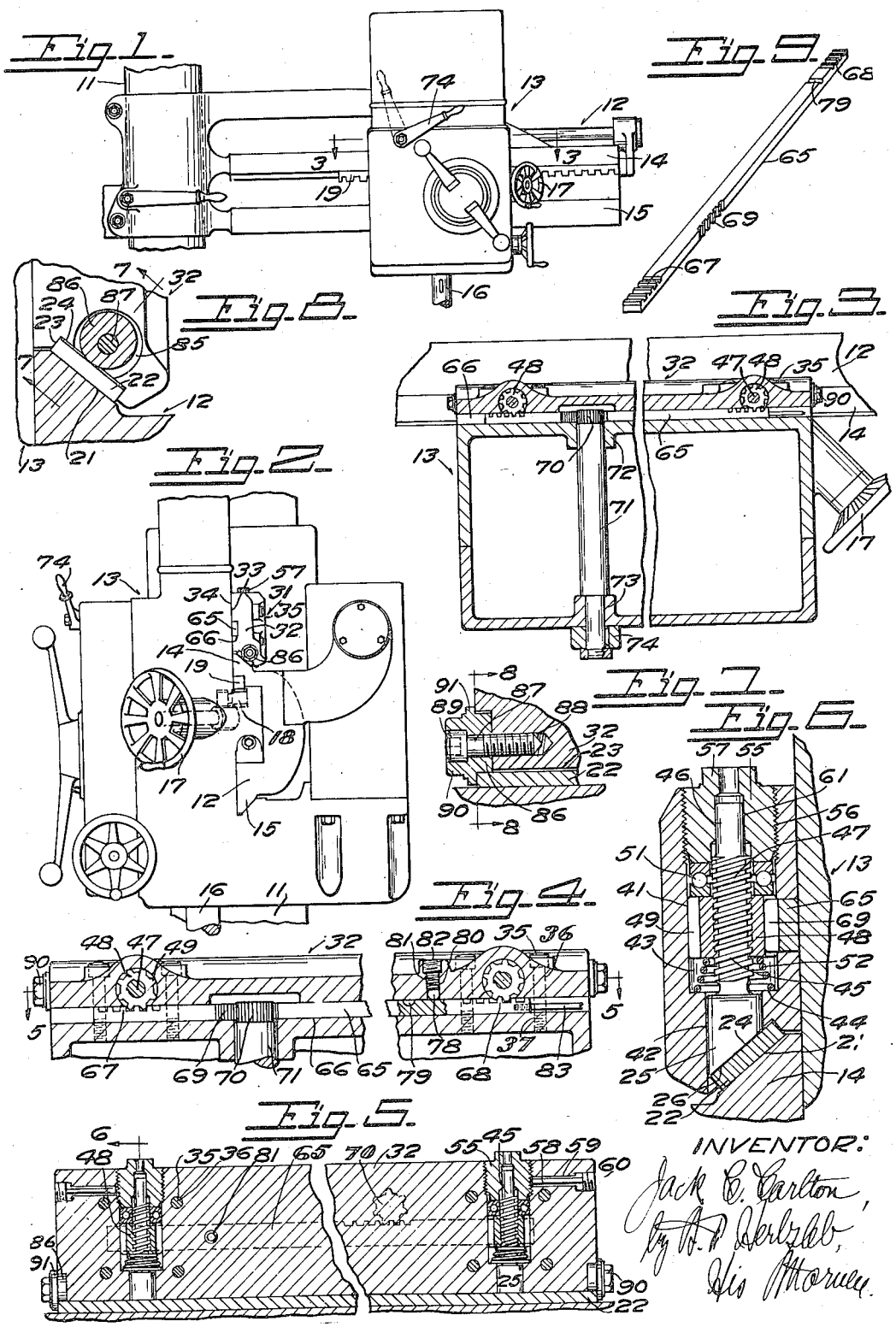
INVENTOR:
Jack C. Carlton,
By W. P. Derlzleb,
His Attorney.

Patented Aug. 4, 1936

2,049,891

UNITED STATES PATENT OFFICE 2,049,891

SLIDE CLAMP

Jack C. Carlton, Cincinnati, Ohio, assignor to The Carlton Machine Tool Company, Cincinnati, Ohio, a corporation of Ohio Application January 13, 1934, Serial No. 706,524

7 Claims. (Cl. 77—28)

My invention relates to slide clamps, especially to such clamps in metal working machinery, and is exemplified in a radial drilling machine, although it is applicable in other relations in which it is desired to securely clamp a slide in adjusted positions.

It is the object of my invention to provide a slide clamp requiring little exertion in effecting the clamping; further, to provide a novel slide clamp capable of being readily securely clamped in position; and, further, to provide a novel slide clamp in which creeping of the slide is avoided.

In metal working machinery, slides, such as tool slides, work slides, and various other slides, are subjected to great strains, which tend to disarrange their adjusted positions. It is essential that the slides shall maintain their adjusted positions in order to produce accurate work.

It has been difficult heretofore in metal working machinery to maintain slides, especially tool slides, in adjusted positions, due to the resistances and operative and torsional strains between the slide and the work during operation, necessitating the employment heretofore of slide clamps which required great force to clamp the slides in adjusted positions, and which, in spite of such great force exerted, were liable to shift during operation and thereby produce inaccuracy in workmanship.

My improved slide clamp removes these objections, and is so constructed that little force is required to clamp the slide in adjusted positions, and that the slide is maintained in securely clamped positions throughout the operation between the tool and the work, or until the clamp is unclamped for readjustment of the slide.

My invention consists in novel means for operating a clamping shoe; further, in novel structure of clamping shoe and novel means for operating the same; further, in combining parts exerting different operating forces in novel manner to aid one another in the clamping; further, in novel means for relieving the clamping force during adjustment of the slide; and, further, in novel means for mounting the clamp.

The invention will be further readily understood from the following description and claims, and from the drawing, in which latter:

Fig. 1 is a front elevation of a portion of a radial drilling machine having my invention applied thereto.

Fig. 2 is an end view of the same.

Fig. 3 is a cross-section of my improved device, taken on the line 3—3 of Fig. 1, and partly broken away.

Fig. 4 is an enlarged cross-sectional view of the same, taken on the line 3—3 of Fig. 1, and partly broken away.

Fig. 5 is a cross-section of my improved device, taken in the plane of the line 5—5 of Fig. 4, and partly broken away.

Fig. 6 is a cross-section of the same, taken in the plane of the section line 6 of Fig. 5.

Fig. 7 is a cross-section of a detail of the same, taken in the plane of the line 7—7 of Fig. 8.

Fig. 8 is a cross-section of the same, taken in the plane of the line 8—8 of Fig. 7; and Fig. 9 is a perspective view of the rack-bar.

The usual rotatable column of a drilling machine is shown at 11, from which a drill-arm 12 extends radially, the construction and the arrangement and adjustments of these parts being as usual in machines of this character.

A tool-slide 13 is adjustable lengthwise of guideways 14, 15 on the drill-arm. The slide may carry a usual drill-spindle 16. The slide is adjustable in usual manner manually or by power lengthwise of the arm. The manual adjusting means may comprise a usual handwheel 17 on the drill-slide operating suitable gearing 18 on the drill-slide meshing with a rack 19 fixed to the drill-arm and extending lengthwise of the guideways on the drill-arm.

My invention relates to the means for clamping the slide in adjusted positions. The guideway comprises a slanting face 21 along which a gib 22 is slidable, the gib being a gib-plate partially let into a groove 23 in the slide. The gib has a slanting contact face 24 which a clamping shoe 25 engages. The clamping end of this clamping shoe is preferably wedge-shaped, for forming a slanting clamping face 26, so that axial movement of the shoe acts with a wedging pressure upon the gib for pressing the gib upon the slanting face of the guideway on the arm. (Fig. 6).

A pair of these clamping shoes and of means adjacent thereto for operating the same are exemplified, similar parts of each of the same being designated by similar reference numerals.

The clamping shoes and adjacent parts are mounted in a clamping unit 31, which is separate from the body of the slide, so that the clamping unit and the parts thereon may be made and assembled separately from the slide proper and be securely fixed to the slide proper after the clamping unit has been finished. (Fig. 2.)

The unit comprises a support 32, which is preferably a separate casting or block, and has an engaging face 33 arranged to be received against the engaging face 34 of the slide proper and to be fixed to the slide proper by means of bolts 35 passing through holes 36 in the support and threaded into holes 37 in the body of the slide. (Fig. 4.)

The support is provided with a compound bore 41 having a portion of less diameter 42 and a portion of greater diameter 43, with a shoulder 44 between the portions of the bores. The shoe 25 is preferably cylindrical and is slidable axially in the bore, the shoe having an outer end wedge face 26 arranged to protrude endwise from the bore in performing its clamping function. (Fig. 6.)

An axial stem 45 extends from the shoe and has an outer guided end 46 and an inner threaded portion 47. A nut 48 is threaded to this threaded portion and has outer peripheral teeth 49, by means of which it is rotated. A friction-reducing bearing 51, shown as an end thrust ball bearing, is located at that end of the nut distanced from the shoe. A spring 52 is located between the nut and the shoulder 44 for normally urging the nut toward the bearing. (Figs. 3, 4, 5 and 6.)

The bearing receives the end clamping thrust of the shoe and nut, and permits ready rotation of the nut during application of clamping force. The spring urges the nut toward the bearing, which is especially useful during unclamping of the clamp for urging the shoe away from the guideway. The shoe and its stem are held non-rotative during rotation of the nut by reason of the wedge face construction between the shoe and the gib.

A plug 55 has threaded connection 56 with the outer threaded end of the bore, the plug having a polygonal end 57, by means of which it may be rotated by a suitable wrench. Adjustment of the plug adjusts the axial position of the bearing 51 and the normal axial position of the shoe for adjusting the moment of clamping of the shoe and the relative clamping effect between the shoes, so that equal clamping pressures are exerted by the respective shoes.

The plug is held in adjusted position, as by means of a rod 58 slidable axially in a hole 59 in the support, the inner end of the rod, which may be of soft material, as of copper, bearing against the threaded face of the plug, and the outer end of the rod being pressed inwardly by a plug 60 threaded into the outer threaded end of the hole 59. (Fig. 5.)

The outer guide end 46 of the stem has guide connection in a bore 61 in the plug. The shoe is thereby guided in axial direction by the guide connection between the shoe and the bore of smaller diameter in the support at one end of the shoe structure and the guiding connection between the other end of its shank and the plug.

The stem of the clamping shoe, its toothed nut 48, the spring 52, the bearing 51 and the plug 55 are located in the bore of larger diameter 43 in the present exemplification of my invention. (Fig. 6.)

The clamping shoes and their attendant parts are located in separated relations in the support, and means are provided for uniformly and simultaneously operating the same. Thus a rack-bar 65 is slidable endwise in a groove 66 in the support, the side of the groove being closed by the face 34 of the body of the slide. The rack-bar is provided with separated sets of rack-teeth 67, 68, which respectively mesh with the teeth of the respective nuts operating the respective clamping shoes. (Figs. 2, 3, 4, 5, 6 and 9.)

The rack-bar is further provided with a set of rack-teeth 69, with which a pinion 70 meshes, the pinion being on a rock-shaft 71, journaled in bearings 72, 73 of the body of the slide and having an operating handle 74 fixed thereto.

Movement of the operating handle in one direction causes movement of the rack-bar in a given direction for simultaneous operation of the clamping shoes. Movement of the operating handle in the opposite direction causes operation of the rack-bar in the opposite direction for simultaneous operation in opposite direction of the clamping shoes. The movement of the handle in clamping direction is preferably downward, as exemplified by the position of the handle in full lines in Fig. 1, whereby the weight of the handle aids in clamping effect upon the clamping shoes. The clamp is preferably released by upward movement of the handle into the dotted position of the handle shown in Fig. 1.

The rack-bar is preferably held in released position for release relation of the clamping shoes, as by the entry of a ball 78 into a slot 79 in the rack-bar, the ball being located in a hole 80 in the support, a spiral spring 81 between the ball and a plug 82 threaded into the outer end of said hole, normally pressing the ball toward the rack-bar. (Figs. 4 and 5.)

The rack-bar is preferably operated manually by the handle 74. It may be operated by power for obtaining an automatic limit control or automatic positioning control of the clamp, as by means of a rod 83 secured to the rack-bar, and shown broken away in Fig. 4, and having connection with a suitable control device for automatically controlling the operation of the rack-bar and of the clamp.

I prefer to provide means whereby the gib 22 is held in normal position with relation to the face 21 of the guideway when the clamp is released, so as to hold the gib in normal relation to the slide, close to its guideway, so as to avoid space between the gib and its guideway, in which dirt might collect to cause uneven clamping of the clamp, and to avoid unnecessary extent of movement of the gib during the clamping and unclamping operations.

The gib preferably extends substantially throughout the length of the slide, and the support is at each end provided with a recess 85 in which an eccentric collar 86 is located. The collar is rotatable on a bolt 87 threaded into the end of the support, as at 88, the head of the bolt having a countersunk polygonally shaped hole 89 for receiving a suitable wrench. (Figs. 2, 4, 7 and 8.)

The collar is provided with an outer polygonally shaped end 90, for receiving a suitable wrench for rotating the same, and holding the same in adjusted positions while the bolt is being secured in place. Rotation of this collar adjusts its outer eccentric periphery so as to properly position the gib with relation to its guideway.

The collar is preferably provided with a flange 91 received against the end of the gib, the flanges of the respective collars at the respective ends of the slide holding the gib endwise and assuring lengthwise movement thereof with the slide.

In operation, the rocking of the handle 74 rocks the pinion 70 and causes endwise shifting movement of the rack-bar 65 for simultaneously rotating both of the nuts 48, and thereby simultaneously axially moving the clamping shoes. The wedge faces of the clamping shoes cause great wedging force to be exerted upon the guideway, and this wedging force is magnified by the micrometer urge of the threaded connection between the threaded geared nuts and the threaded stems of the clamping shoes. These clamping actions are also magnified additionally by the leverage between the operating handle 74 and the gearing between the rockshaft 71 and the rack-bar 65 and the gearing between the rack-bar 65 and the nuts 48.

It has been found in practice that with slides of similar weight and guided by similar guideways, where heretofore it had been necessary to apply great force upon the clamping agencies as heretofore constructed, it is necessary to exert only very little force upon the operating handle of my improved device for firmly securing a similar slide to a similar guideway to obtain thoroughly effective clamping and maintenance of clamping of the slide to the guideway.

It is, of course, obvious that changes may be made in the embodiment of my invention which I have shown and described without departing from the spirit of my invention set forth in the accompanying claims.

Having thus fully described my invention, what I claim as new and desire to secure by Letters Patent, is:

1. In a slide clamp, the combination of a support provided with a bore having a portion of less diameter and a portion of greater diameter with a shoulder between them, a shoe slidable in the bore portion of less diameter, said shoe provided with a stem having an outer guide end and an inner threaded portion, a nut about said threaded portion, a threaded plug threaded in the outer end of the bore portion of greater diameter and provided with a guide in which the outer guide end of said stem is guided, and spring between said nut and said shoulder urging said nut toward said plug, said plug forming an end thrust member for said nut, said threaded plug adjustable axially in said bore of greater diameter for axial adjustment of said nut whereby to axially adjust said shoe, and said spring resiliently accommodating said adjustments of said plug.

2. In a slide clamp, the combination of a pair of members, one of which is slidable on the other, one of said members provided with a plurality of spaced-apart bores, and clamping means in each of said bores, each of said clamping means comprising a clamping shoe coacting with the other of said members, a threaded stem and a nut threaded together and forming a pair of interthreaded elements, one of which has operative connection with said clamping shoe and the other of which is rotatable, an end thrust member between said one of said members and said rotatable element limiting movement of said rotatable element in unclamping direction, a spring urging said interthreaded elements in unclamping direction, said threaded stem, said nut and said spring being located in said bore between said clamping shoe and said end thrust member, said clamping shoe and said end thrust member being located at the respective ends of said bore, and adjusting means for said end thrust member adjusting the endwise position of said rotatable element in said bore and thereby equalizing the clamping forces of said respective clamping shoes; gearing connecting said rotatable elements, and an operating part for said gearing constructed and arranged whereby to effect combined and equal movements of said clamping shoes.

3. In a slide clamp, the combination of a pair of members one of which is slidable on the other, one of said members provided with a bore, and clamping means in said bore comprising a clamping shoe coacting with the other of said members, a threaded stem and a nut threaded together and forming a pair of interthreaded elements, one of which has operative connection with said clamping shoe and the other of which is rotatable, an end thrust member between said one of said members and said rotatable element limiting movement of said rotatable element in unclamping direction, a spring urging said interthreaded elements in unclamping direction, said threaded stem, said nut and said spring being located in said bore between said clamping shoe and said end thrust member, said clamping shoe and said end thrust member being located at the respective ends of said bore, and adjusting means for said end thrust member adjusting the endwise position of said rotatable element in said bore.

4. In a slide clamp, the combination of a pair of members one of which is slidable on the other, one of said members provided with a bore, and clamping means in said bore comprising a clamping shoe coacting with the other of said members, a threaded stem and a nut threaded together and forming a pair of interthreaded elements, one of which has operative connection with said clamping shoe and the other of which is rotatable, an end thrust member between said one of said members and said rotatable element limiting movement of said rotatable element in unclamping direction, said threaded stem and said nut being located in said bore between said clamping shoe and said end thrust member, said clamping shoe and said end thrust member being located at the respective ends of said bore, and adjusting means for said end thrust member adjusting the endwise position of said rotatable element in said bore.

5. In a slide clamp, the combination of a pair of members one of which is slidable on the other, one of said members provided with a bore having a bore portion of less diameter and a bore portion of greater diameter with a shoulder between said bores, a clamping shoe in said bore portion of less diameter coacting with the other of said members, a threaded stem and a nut threaded together in said bore portion of greater diameter and forming a pair of interthreaded elements one of which has operative connection with said clamping shoe and the other of which is rotatable, end thrust means at one end of said bore portion of greater diameter for said rotatable element limiting movement of said rotatable element in unclamping direction, resilient means between said shoulder and said pair of interthreaded elements to normally urge said clamping shoe away from said other of said members to relieve sliding friction between said shoe and said other of said members, and adjusting means between said one of said members and said end thrust means adjusting the position in axial direction of said rotatable element toward and from said shoulder and acting on said resilient means, whereby to adjust the clamping effect of said clamping shoe.

6. In a slide clamp, the combination of a pair of members one of which is slidable on the other, one of said members provided with a bore, a clamping shoe in said bore coacting with the other of said members, a threaded stem and a nut threaded together in said bore and forming a pair of interthreaded elements one of which has operative connection with said clamping shoe and the other of which is rotatable, friction reducing end thrust means having coactive connection with said rotatable element whereby to limit movement of said rotatable element in unclamping direction and to maintain said rotatable element in its plane perpendicular to its axis during rotation, and adjusting means for endwise adjustment of said friction reducing end thrust means to adjust the normal position in axial direction of said rotatable element whereby to adjust the clamping effect of said clamping shoe.

7. In a slide clamp, the combination of a pair of members one of which is slidable on the other, one of said members provided with a plurality of spaced-apart bores, each of said bores having a bore portion of less diameter and a bore portion of greater diameter and a shoulder between said bores, the other of said members provided with a guide intersecting one of the ends of said bores, a clamp shoe in each of said bore portions of less diameter coacting with said guide, a threaded stem and a nut threaded together in each of said bore portions of greater diameter and each forming a pair of interthreaded elements, one of which has operative connection with one of said clamping shoes and the other of which is rotatable, end thrust means in each of said bore portions of greater diameter for said rotatable element therein limiting movement of said rotatable element in unclamping direction, resilient means between each of said shoulders and said respective pairs of interthreaded elements to normally urge said respective clamping shoes away from said guide to relieve sliding friction between said shoes and said guide, adjusting means between said one of said members and said respective end thrust means adjusting the positions in axial directions of said respective rotatable elements toward and from said respective shoulders and acting on said respective resilient means, whereby to adjust the respective clamping effects of said respective clamping shoes, and driving means extending between and having operative connections with said respective rotatable members for clamping and unclamping said shoes.

JACK C. CARLTON.